No. 613,064. Patented Oct. 25, 1898.
W. A. FORCE.
FLEXIBLE SHEET FOR RUBBER STEREOTYPE BASES.
(Application filed Dec. 31, 1897.)
(No Model.)
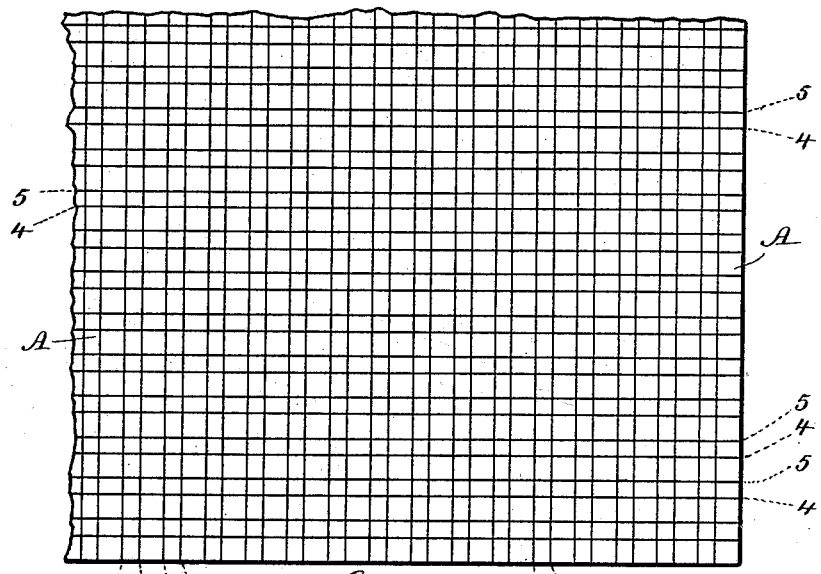
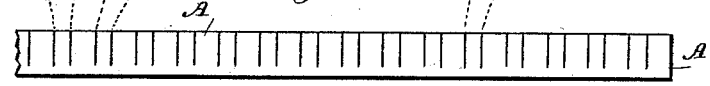
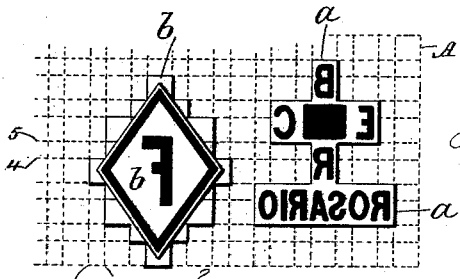
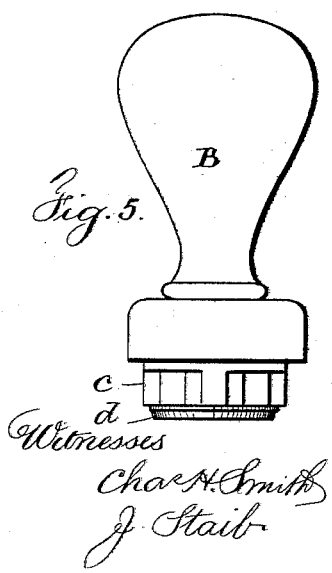
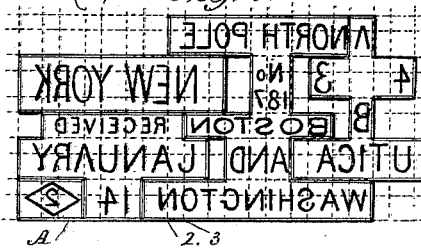
Witnesses
Chas H. Smith
J. Staib
Inventor.
William A. Force
by
L. W. Serrell & Son
Atty
THE NORRIS PETERS CO., PHOTO-LITHO., WASHINGTON, D. C.

UNITED STATES PATENT OFFICE.

WILLIAM A. FORCE, OF NEW YORK, N. Y.

FLEXIBLE SHEET FOR RUBBER STEREOTYPE-BASES.

SPECIFICATION forming part of Letters Patent No. 613,064, dated October 25, 1898.

Application filed December 31, 1897. Serial No. 664,830. (No model.)

*To all whom it may concern:*

Be it known that I, WILLIAM A. FORCE, a citizen of the United States, residing at New York, (Brooklyn,) in the county of Kings and State of New York, have invented a new and useful Improvement in Flexible Sheets for Making Rubber Stereotype Bases or Cushions, of which the following is a specification.

This invention relates to an improved form of rubber sheets for making flexible bases for rubber stereotypes and the like.

Soft-rubber bases for rubber stereotypes have heretofore been employed that were cut from blanks of homogeneous material of even thickness; but in cutting these blanks to nearly correspond to the outline of the rubber stereotype raw edges of rubber are exposed that are objectionable. These blanks have also been used collectively to build up a surface necessary for large rubber stereotypes. This operation was wasteful of time and expensive. Rubber bases have also been made with grooves running in one direction, but raw edges always appeared at the severing places on two ends.

The object of my invention is to provide an economical soft-rubber or flexible sheet from which type-bases for rubber stereotypes may be cut at the severing-grooves running in both directions to approximately correspond to the various sizes and shapes of the rubber stereotypes. This is most economically accomplished by laying the stereotypes upon the sheets in an interlocking position, so as to utilize the whole of the sheet for the stereotypes and cut the same up without waste.

In carrying out my invention I mold a sheet of suitable thickness with grooves that extend nearly through the thickness of the sheet and cure or vulcanize the same. These grooves are parallel and in two sets that cross one another, preferably at approximately right angles to each other. The parallel grooves are preferably at varying distances apart. Consequently the sheet is divided into small rectangular blocks of square and oblong configuration upon a connecting web or foundation. These blocks may vary in size, but the faces and sides of the same are smooth and finished by the molding and vulcanizing operation.

In making the hand-stamp the rubber stereotype-base is cemented to the grooved surface of the sheet in a position where the outlines of the rectangular blocks most nearly correspond to the outline of the stereotype-base. The web of the sheet at the bases of the rectangular blocks is then cut through to form a foundation for the rubber stereotype, which is then secured to the platen or rigid part of the hand-stamp, either directly on the surface thereof or in a recess in said surface.

In this device the only part of the rubber that is severed is the web, which is insignificant, as the entire surfaces adjacent to the rubber stereotype are smooth and finished, and the rectangular blocks being as small as about three-sixteenths and one-eighth of an inch across their faces allow the base to be cut approximately to the shape of the stereotype much more easily than has heretofore been possible.

In the drawings, Figure 1 is a plan of a sheet made according to my invention. Fig. 2 is an edge view of the same. Fig. 3 shows two rubber stereotypes with the bases therefor in full lines as cut from the sheet shown by dotted lines. Fig. 4 is a view similar to Fig. 3, illustrating how the rubber stereotypes can be placed side by side upon the sheet, so as to cut up the sheet economically. Fig. 5 is an elevation of a hand-stamp complete.

The sheet A is molded with narrow deep grooves 2, 3, 4, and 5, that extend nearly through the thickness of the sheet. The severing-grooves 2 3 are parallel to each other, but preferably of varying distances apart. The severing-grooves 4 5 are parallel to each other, but preferably of varying distances apart, and the severing-grooves 2 3 extend at right angles to the severing-grooves 4 5. The grooves 2 3 and 4 5 are separated by distances of about one-eighth of an inch, while the grooves 3 2 and 5 4 are separated by about three-sixteenths of an inch. These severing-grooves separate one surface of the sheet A into rectangular blocks of square and oblong form.

The surfaces and sides of the rectangular blocks are smooth and finished by the molding and vulcanizing operation. The sheet A may be of soft or sponge rubber, at the option of the maker.

In Fig. 3 two illustrative forms of rubber stereotypes are shown upon the improved sheet, the severing-grooves in sheet A, from which the bases are cut, being shown by dotted lines, and in Fig. 4 I have illustrated the economical use of the sheet by interlocking the rubber stereotypes upon the surface of the sheet preparatory to cutting up the sheet to correspond therewith without material waste. The full lines surrounding the rubber stereotypes *a b*, Fig. 3, and that agree with the divisional lines or severing-grooves, indicate the lines upon which the sheet is cut when the rubber stereotype has been cemented to its surface. The divisional lines of the sheet exactly agree with the outline of the stereotype *a*, and in the case of the stereotype *b* they only project slightly beyond the boundary thereof, but not sufficiently for the ink of the pad to lodge on the corners of the square or rectangular blocks.

The hand-stamp B, Fig. 5, is of ordinary character, comprising a handle and a rigid base or platen, to which the rubber base *c* is secured and upon the face of which the stereotype *d* is cemented for use.

It is obvious that a sheet constructed according to my invention is adapted for use with rubber stereotypes of any form, and the base has a neat appearance and smooth and finished sides in all cases, and the appearance is satisfactory and the bases are economically made and applied to the stereotypes.

I claim as my invention—

1. A molded sheet for rubber stereotype-bases, comprising an integral body of soft rubber provided with two sets of parallel severing-grooves in one face the grooves of said sets crossing one another and dividing the sheet into blocks, so that the type-bases cut from the sheet will present smooth and finished surfaces and edges, substantially as set forth.

2. A molded sheet for rubber stereotype-bases, comprising an integral body of soft rubber provided with two sets of parallel severing-grooves in one face of varying distances apart the grooves of said sets crossing at right angles to one another and dividing the surface up into rectangular blocks of square and oblong form, the sheet being molded and vulcanized with the grooves so that the blocks present smooth and finished surfaces, substantially as set forth.

Signed by me this 27th day of December, A. D. 1897.

WM. A. FORCE.

Witnesses:
HAROLD SERRELL,
GEO. T. PINCKNEY.